June 7, 1955  E. B. PASCUCCI  2,709,883
LAWN MOWER
Filed May 25, 1951  4 Sheets-Sheet 1
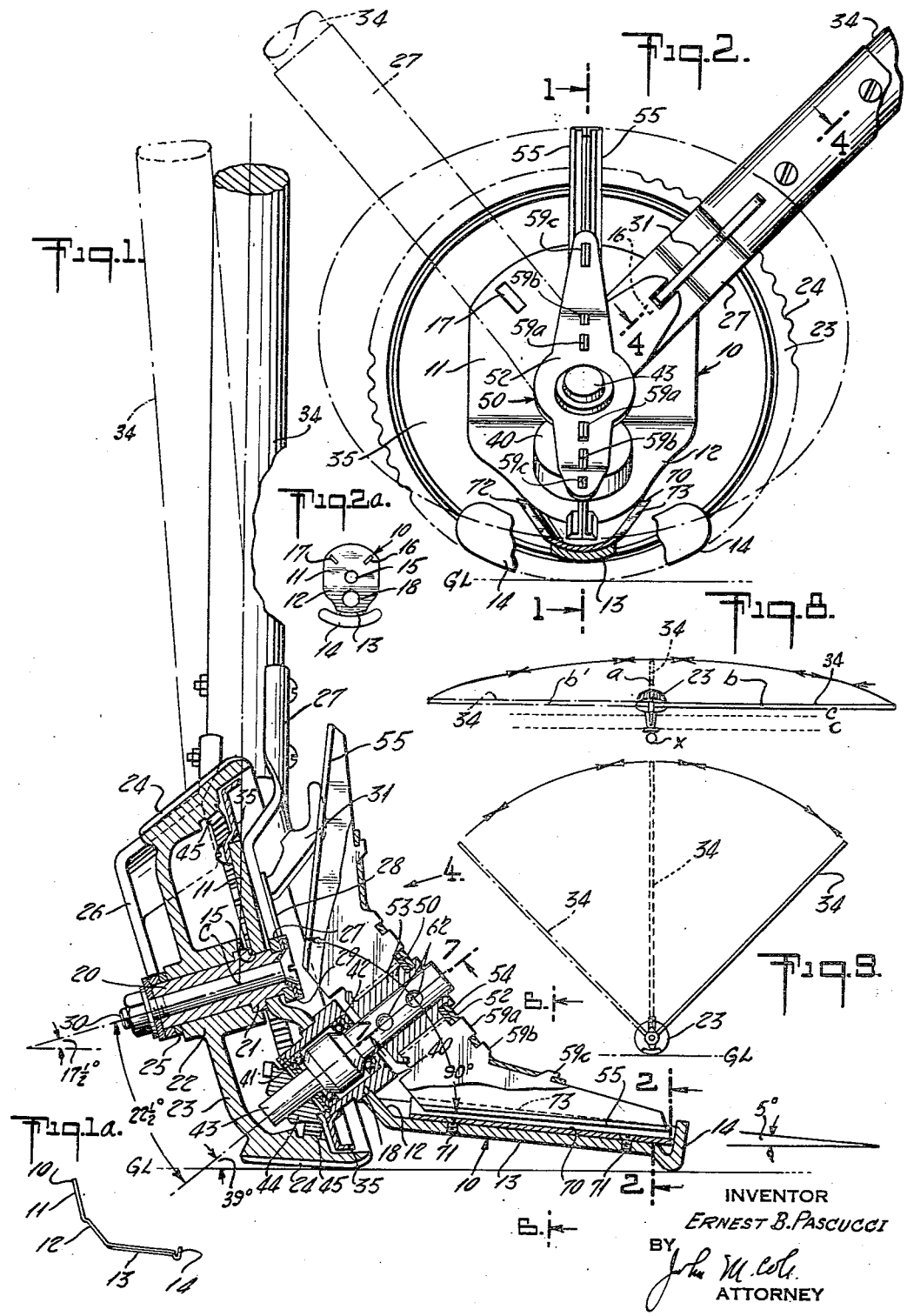
INVENTOR
ERNEST B. PASCUCCI
BY
*John M. Cole*
ATTORNEY

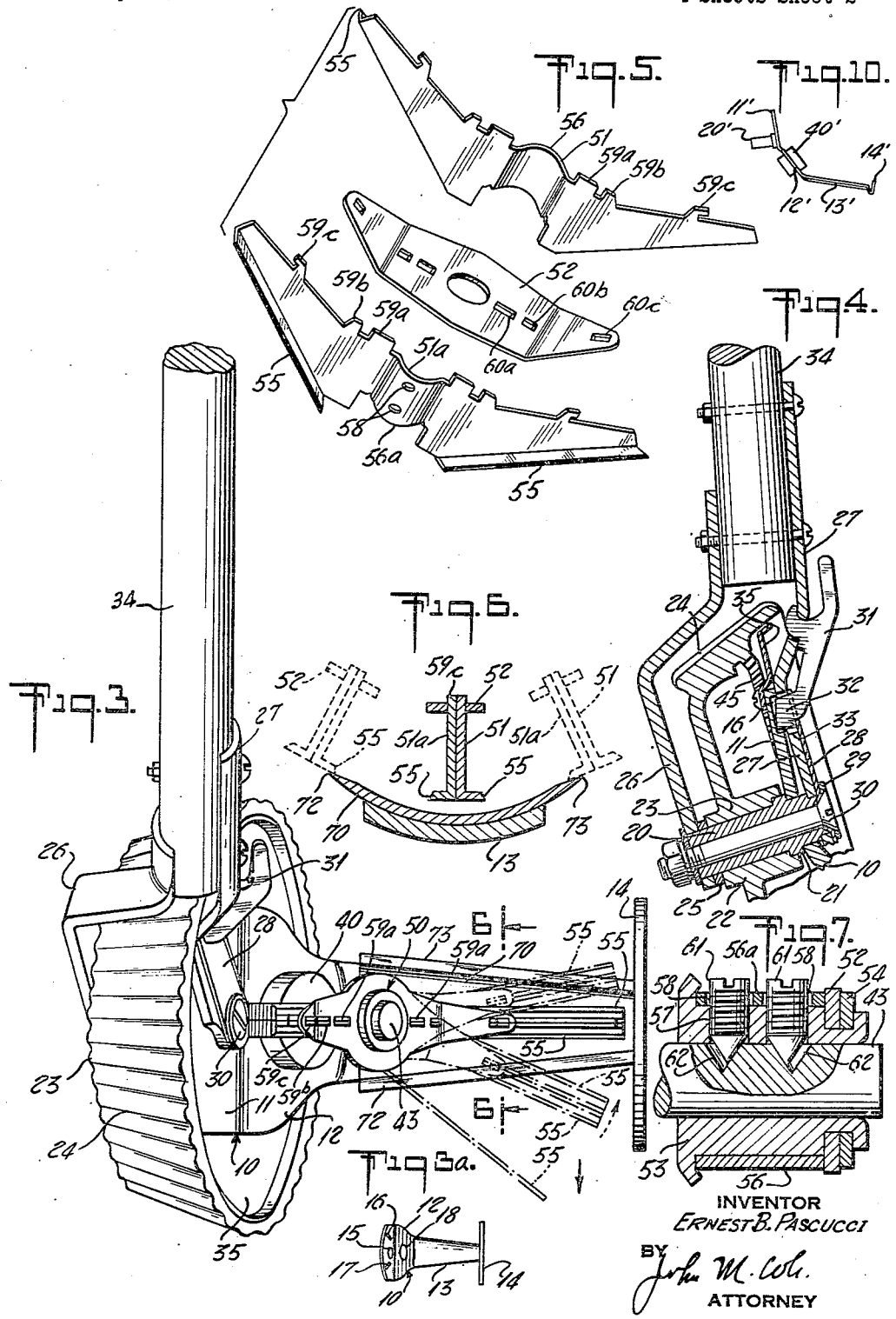

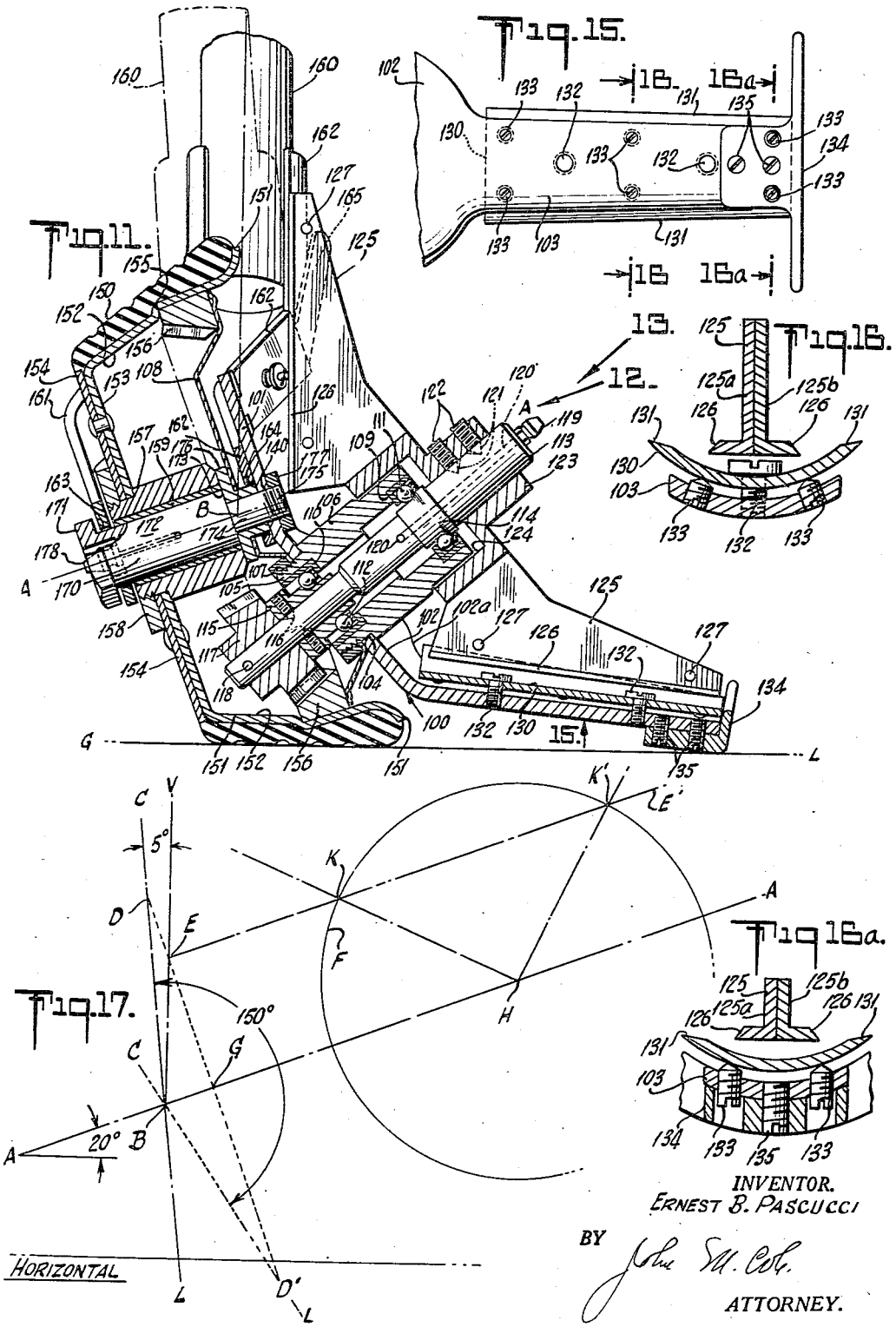

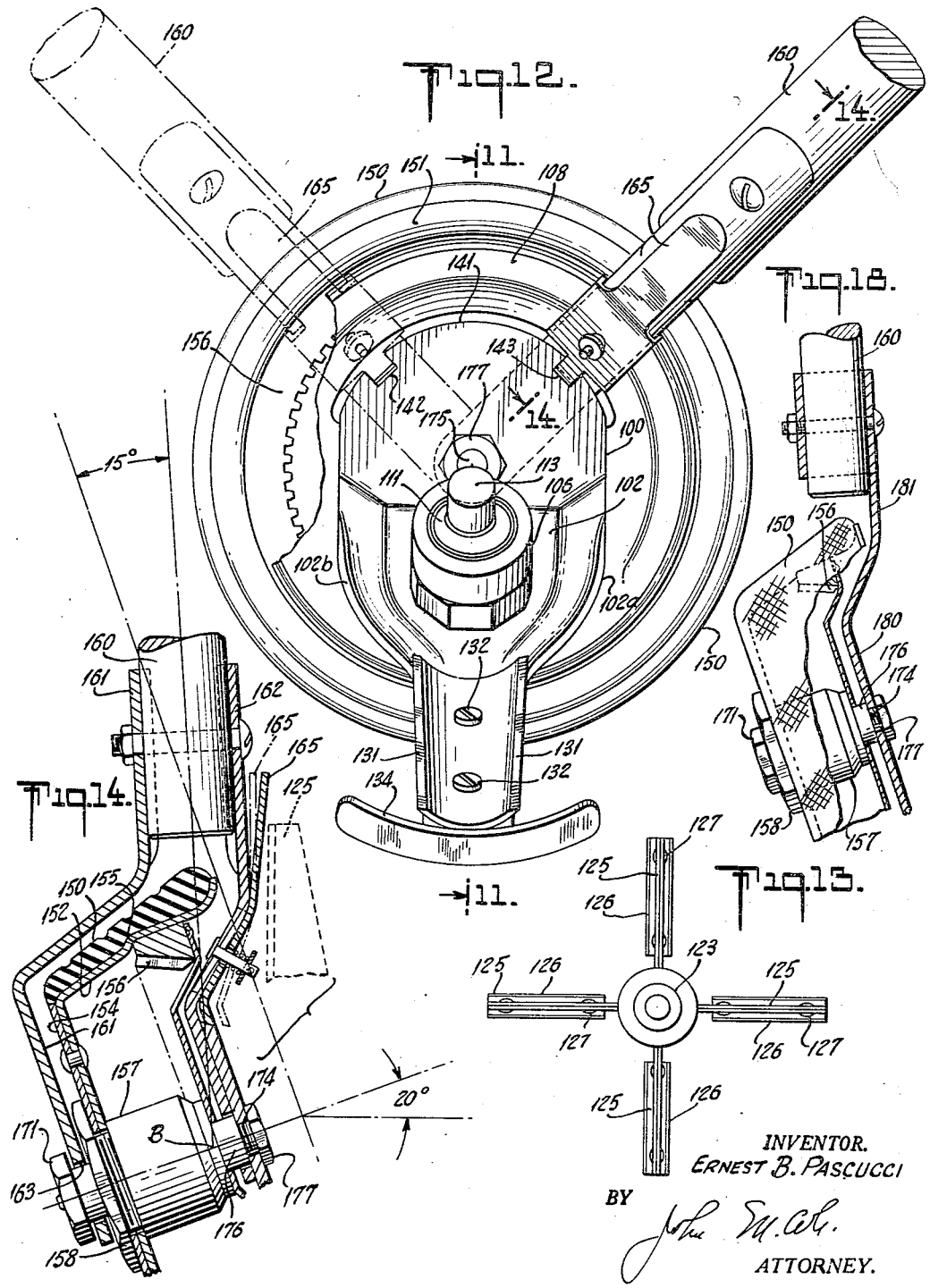

United States Patent Office 2,709,883
Patented June 7, 1955

2,709,883

LAWN MOWER

Ernest B. Pascucci, Meriden, Conn.

Application May 25, 1951, Serial No. 228,195

37 Claims. (Cl. 56—255)

The present invention relates to lawn mowers and is more particularly directed toward lawn mowers suitable for use as trimmers to trim along the edge of a lawn or around shrubbery or obstructions where, owing to the difficulty or impossibility of using the conventional lawn mower with one or two wheels and spiral blades, it is necessary to resort to some form of a hand operated shear.

According to the present invention, the lawn mower has a single ground wheel which revolves about a tilting or sloping axis as it is rolled along the ground, a laterally extending shoe which carries a stationary shear plate slightly above the ground, and a ground wheel driven rotary cutter which cooperates with the shear plate on the shoe to cut off the grass. The ground wheel is preferably of conical shape and leans away from the shoe and the rotary cutter has blades which traverse a conical path about an oblique axis in the vertical plane through the wheel axis and the center of the shoe. The shoe carried shear blade and the rotary cutter blades face in both directions so that cutting of grass takes place irrespective of directions of movement or rotation of the ground wheel on the ground.

A particular area to be trimmed or cut may, as one views the work, extend to the left or to the right of the obstruction, and the present invention contemplates a mower wherein by a simple adjustment of the operating handle the mower may operate with the shoe extending to the left or to the right of the ground wheel so that the wheel is always away from the obstruction. This makes it unnecessary to have both a left-handed trimmer and a right-handed trimmer, or for the operator to assume awkward positions to reach the grass.

A further object of the invention is to arrange the parts so that when the single ground wheel is in normal rolling contact with the ground, the shoe is automatically located just above the ground in a position for shearing off the grass, and the conical wheel, by a simple thrust on a stick-like handle is caused to roll in a straight line path without tending to twist and turn into curved paths.

Other and further objects will appear as the description proceeds.

The accompanying drawings show, for purposes of illustrating the present invention, two embodiments in which the invention may take form, together with modifications, it being understood that the drawings are illustrative of the invention rather than limiting the same.

In the accompanying drawings:

Figure 1 is a vertical sectional view taken on the line 1—1 of Figure 2, showing one form of construction, the handle being shown in full lines in a normal operating position and in dot and dash lines in a non-operating position;

Figure 1a is a reduced outline view of the mower body member taken in the same direction as Figure 1;

Figure 2 is a side elevational view taken from the right of Figure 1 with parts in section on the line 2—2 of Figure 1, the full line position of the handle corresponding with the full line position of Figure 1, the dot and dash line showing it in the other normal operating position;

Figure 2a is a reduced outline view of the mower body member taken in the same direction as Figure 2;

Figure 3 is a top plan view of the mower;

Figure 3a is a reduced top plan view of the body member in outline;

Figure 4 is a fragmentary section taken in the plane 4—4 of Figure 2 and in the direction of the arrow 4, Figure 1, to show the catch engaged;

Figure 5 is an exploded view showing the rotary cutter parts;

Figure 6 is an enlarged section on the line 6—6 of Figures 1 and 3, showing the stationary and movable shear blades;

Figure 7 is an enlarged section taken on the line 7—7 of Figure 1, showing the adjustment for the rotary cutter blades;

Figures 8 and 9 are the diagrammatic views showing the relation of the hande and other parts of the mower, Figure 8 being a top plan view and Figure 9 a side elevational view;

Figure 10 illustrates a modified form of body member;

Figure 11 is an enlarged vertical sectional view similar to Figure 1 through a preferred form of construction, and taken on the line 11—11 of Figure 12;

Figure 12 is an enlarged elevational view taken in the direction of the arrow 12 of Figure 11;

Figure 13 is a reduced elevational view of the rotary cutter taken in the direction of the arrow 13, Figure 11;

Figure 14 is an enlarged section taken on the line 14—14 of Figure 12;

Figure 15 is a fragmentary inverted plan view taken in the direction of arrow 15, Figure 11, to illustrate the shoe and stationary shear plate;

Figures 16 and 16a are sections on lines 16—16 and 16a—16a, respectively, of Figure 15;

Figure 17 is a diagrammatic illustration; and

Figure 18 is a view similar to Figure 14 illustrating a construction having fixed relation of handle to stationary shear plate.

All parts of the mower of Figures 1 to 9 are directly or indirectly carried from a body member designated generally as 10 and here shown in the form of a stamping. In use, it is located in space in the relation to the ground line GL as shown in the drawings. It has an upper relatively broad end 11 which slopes away from the vertical (to the left as indicated in Figure 1), an intermediate narrower portion 12 which slopes downwardly on the other side of the vertical, and a narrower shoe-like extension 13 which carries an elongated vertical flange 14. The upper broad portion 11 of the body member is apertured as indicated at 15 and provided with two notches 16 and 17, preferably at 45° each side of the vertical median plane through the center of the opening 15. The intermediate portion 12 of the body member has a relatively large opening 18.

The opening 15 in the body member receives a tubular wheel bearing member or axle 20 having a shoulder 21 bearing against the lower or left face of the body member 10. This member 20 which in the case of a cast body (Figure 10) would be integral with it, receives the hub 22 of a ground wheel 23 having a conical surface 24 shown corrugated as indicated. The member 20 also receives a bearing washer 25, a lower handle bracket 26 and an upper handle bracket 27. These parts, together with a spring plate 28 and washer 29 are held in place by a bolt 30 which passes through a hole in the member 20. This construction makes it possible for the ground wheel 23 to revolve about the axle 20 as an axis and for the handle members 26 and 27 to be adjusted about the same axis.

The front or upper handle carrying member 27 is offset as indicated and carries a thumb piece or latch lever 31, the nose 32 of which passes through a hole 33 in the handle carrying member 27 and is engaged by the spring 28. The handle securing members 26 and 27 support a handle 34 usually a woden stick about 4½ feet long. The latch lever 31 is adapted to enter into one or the other of the notches 16 or 17 in body member 10 so as to lock the handle carrying member 27 in either the full line position of Figures 1, 2, 3, 8 and 9 or to permit shifting it to the dot and dash position of Figures 2, 8 and 9. Thus, the handle member can be placed 45° to the horizontal, also 45° to the right or left of the vertical plane of the line 1—1, Figure 2, and latched in such position so that the handle, the body member and fixed parts carried thereby are relatively immovable.

The handle supporting members 26 and 27 are shaped so that the handle 34, when in the dotted line position of Figure 1, makes a substantial angle with the axle about which the handle turns. Owing to this angularity and the manner in which the handle is mounted, the handle 34 shifts about the axis of the ground wheel in a conical path with apex at C and its center of gravity shifts from a position behind the ground wheel toward the front of the ground wheel, and the sloping handle may be in a vertical plane at right angles to plane 1—1.

The body member 10 carries a cover plate 35 which closes off the space between it and the inside of the ground wheel 23. This plate keeps dirt away from the gearing.

The opening 18 in the intermediate portion of the body member is employed to support a bearing housing member 40 which may be a turning welded in place. Where a cast construction is used, the housing 40 would be integral with the body member. The housing carries on ball-bearings, indicated at 41 and 42, a shaft 43. The lower inner end of this shaft carries a gear 44 which meshes with a series of internal gear teeth 45 carried by the ground wheel 23 so that the shaft 43 may be revolved at high speed in the same direction in which the ground wheel is revolving.

The outer end of the shaft 43 carries a rotary cutter assemblage generally designated by the reference character 50. This assemblage includes two steel stampings 51, 51a, a locking-on bridge plate 52, hub member 53 and washer 54. The stampings 51, 51a have flanges 55 at right angles to one another and to the plate and adapted to be ground to provide cutting edges. These parts are assembled by placing the two members 51, 51a back to back with the hub 53 in the bulged portions 56 and 56a of the stampings 51, 51a, and with the threaded holes 57 in the hub opposite the openings 58 in the portion 56a of the stamping 51a. This places the aligning prongs 59a, 59b, 59c of the plates 51, 51a opposite one another as indicated in the drawings and in a position to receive the locking plate 52, which has holes 60a, 60b, 60c, in a position to receive the prongs 59a, 59b, 59c. The washer 54 is then inserted in place and the assemblage put into a press so that the end of the hub can be upset as shown in Figure 7 to securely fasten these parts together. The cutter blades 55 are then sharpened.

The rotary cutter assemblage is mounted on the shaft 43 by screws 61 (Figure 7), which enter into conical recesses 62 in shaft 43, so that by loosening and tightening the screws the rotary cutter can be adjusted along the shaft and locked against rotation on the shaft.

The downwardly extending portion 13 of the body member is of tapered width as appears in the drawings and of curved cross-section as shown more clearly in Figure 6. It carries a stationary shear plate 70 held in place by screws 71. The fixed shear plate 70 has edges 72, 73 which narrow outwardly as indicated in the drawings and these stationary cutter edges are ground to lie in the surface of a cone and to properly cooperate with the edges of the rotary cutter.

As will be obvious from Figure 1, the stationary shear plate is dished substantially so as to clear the rotary cutter. The different positions shown by the rotary cutter as it revolves about its axis are indicated by the dot and dash line positions of Figure 3. When the mower is moving in the direction of the arrow at the lower right part of Figure 3, the lower cutter edge 73 is moving in one direction while the active cutting edge 55 of the rotary cutter is moving in the other direction as indicated by the dotted arrow, thereby effecting a shearing action as the mower advances. The same action takes place between the other stationary and moving knives when the mower is moved the other way. When the mower is resting on the ground line GL with the parts indicated in the position indicated in Figures 2 and 3, the axis of the bushing or axle 20 is at an angle of about 17½° to the horizontal. The shaft 43 is at an angle of 22½° with the ground wheel axis and the shoe portion 13 of the body member at an angle of about 5° with the horizontal. The cutting edges 55 of the rotary cutter shown are at 90° to one another so that they traverse a cone of 90° apex angle with its axis at 39° to the horizontal. The body, ground wheel, rotary cutter and stationary cutter (without the handle) form a pre-assembled unit, whose center of gravity is to the left of the ground contacting surface of the ground wheel, Figure 1, and the structure is not stable. When the handle is attached and in operating position, the center of gravity of all these parts is sufficiently to the right of Figure 1 so that the structure is stable and the extreme end of the shoe and the ground wheel normally rest on the ground without a tendency for the wheel to tip backward (or to the left).

When the handle is in the non-operating, mid or dotted line, position of Figures 1, 8 and 9, it leans backwardly so far that the mower would tend to tip over. Owing, however, to the manner in which the handle is secured to the axle about which the ground wheel revolves and to the fact that the handle is shifted about 45° to the right or to the left of the vertical, as shown in Figures 8 and 9, there is a substantial shift of the center of gravity of the handle 34. Instead of being at the point marked a, Figure 8, where it tends to tip the mower backward, it is shifted forwardly to either the point b or b' where it is substantially in line with the wheel 23. The extreme end of the handle is of course supported by the operator so that most of the weight of the handle is moved so far forwardly or toward the cutting edge that there is no tendency for the handle to upset the mower or tip it backward; instead, it holds the mower more tightly to the ground so that by merely pushing the handle forward or pulling it back, as the case may be, the ground wheel rolls over the ground and the ground shoe moves along the surface of the ground without requiring any conscious effort to turn the mower to keep the cutter close to the ground. The line of thrust of the handle against the axle of the moving wheel is such that the wheel moves in a straight line, so that a narrow strip of grass, such as that indicated between the two lines c, c, Figure 8, is cut by the cutter. This cutting takes place irrespective of whether the mower is pushed forward or pulled backward, and any slight up and down or rocking movement of the handle which may occur in such operation is of no consequence as it merely raises one cutter edge slightly and lowers the other. Any grass which is left too long when the cutter is pushed in one direction is cut off when it is brought back in the other direction.

When the handle is in the full line position, as shown in the drawings, and the operator faces the mower as he would from the right of Figure 8, the cutter is to the left of the operator or is to the right of the obstruction such as indicated at X, Figure 8. In this adjustment, the mower is adapted to work around and close to all objects which are to the left of the operator. Should the object, however, be to the right of the operator, the handle is shifted from the full line position of Figures 2, 8 and 9 to the dot and dash lines of these figures and latched in position. The mower will then be handled by an operator working from the left of Figures 8 and 9 and the mower will then operate to trim grass to the left side of an obstruction such as X. With the mower, one can reach all the way to the obstruction and cut the grass so close that the need for hand trimming is obviated.

The double arrowed lines of Figures 8 and 9 show portions of the ellipitical path through which the end of the handle moves in shifting it from one position to the other, the remaining parts of the mower being deemed to be stationary. This shifting operation, however, is accomplished by grasping the body extension 13 and the rotary cutter in one hand, so that the cutter cannot turn, while the other hand is used to release the latched lever 31 and swing the handle from one position to the other.

Figure 10 illustrates a cast form of body 10' in which bearing member 20' and bearing housing 40' are integral with parts 11', 12', 13' and 14', corresponding with those of the preceding figures.

A preferred form of construction for the lawn mower is illustrated in Figures 11 to 17, inclusive. In this construction all parts of the mower are directly or indirectly carried from a body member 100 having an upper flat portion 101, an intermediate portion 102, flanged as indicated at 102a and 102b and a shoe portion 103. The central portion 102 of the body is apertured as indicated at 104 to receive the reduced lower end 105 of a shaft barrel or bushing 106. This bushing is locked in place by a nut 107 threaded on the lower end of the barrel 106. The nut also secures a dust plate 108 in place.

The barrel 106 has bearing seats 109 and 110 for ball bearings 111 and 112 of the type to carry radial and thrust loads. The bearings carry a shaft 113 corresponding with shaft 43 previously described. The upper end of the shaft has a downwardly facing bearing surface 114 opposite the bearing 111 and adapted to engage this bearing. Near the lower end the shaft carries a sleeve 115 cooperating with the lower bearing 112 and adjustable to prevent axial movement of the shaft by means of conical pointed screws 116 entering suitably placed recesses in the shaft 112. The lower end of the shaft 112 carries a beveled pinion 117, the same being secured in place by a cotter pin 118. A lubricating fitting 119 on the end of the shaft 112 communicates by means of passage 120 with the ball bearings so that lubricant can be supplied to the ball bearings and the gear 117. The upper end 113 of the shaft has conical recesses 121 to receive conical headed screws 122 carried in a hub 123. This hub is recessed as indicated at 124 to extend down around the outer end of the barrel 106. Four pairs of sheet steel shear blades 125 are welded to the hub. Each pair of these shear blades is formed of two pieces 125a and 125b of L-shaped cross-section, Figure 16, so as to present oppositely facing cutting edges 126. The sheet steel blade forming members are pivoted as indicated at 127. These cutting edges are sharpended and lie in a cone about the axis of the shaft 112. As shown, the angle of the cone is approximately 97°. The shoe portion 103 of the body member 100 carries a shear plate 130 of arc-shaped cross-section and having tapered shearing edges 131, 131 similar to the edges of the shear plate previously described. The shear plate 130 is adjustably secured to the shoe 103 by means of screws 132 adapted to force it downwardly and a number of upwardly extending screws 133 accessible from underneath and adjustable against the bottom of the shear plate. The edges of the shear plate are ground to be in a cone of the same angle as the edges of the rotary cutter. The end of the shoe 103 carries a fender 134, the same being secured in place by screws 135.

The upper end 101 of the body member 100 is provided with a threaded hole 140 and has an arc-shaped edge 141 centered about the center of the hole 140. This edge is notched as indicated at 142 and 143.

The ground wheel shown in Figures 11 to 14 has a rubber tread 150 of conical shape secured to the periphery of a cup-shaped stamping 151. This stamping has generally conical shaped side walls 152, an apertured bottom 153 preferably reinforced by a plate 154 riveted to it. The cup-shaped stamping is shouldered as indicated at 155 and a beveled gear 156 is secured to it. An axle bearing member 157 extends through the hole in the bottom of the cup-shaped member 151 and the reinforcing plate and is securely fastened in place by a nut 158. The bearing member preferably carries a brass bushing 159.

The handle 160 corresponding with the handle 34 above described is secured to two handle carrying members or extensions 161 and 162 adapted to embrace the ground wheel as indicated in the drawings. The lower ends of these handle extensions are apertured as indicated at 163 and 164. The front extension 162 carries a spring biased latch lever 165 with reduced lower end adapted to enter one or the other of the notches 142 or 143 to angularly locate the handle.

The ground wheel and handle are secured to the body member by an axle 170. This axle has a hexagonal head 171, also a bearing portion 172 which extends through the hole 163 in the handle extension 161 and the bushing 159. The axle has a reducing shoulder as indicated at 173, a reduced diameter portion 174 and is threaded as indicated at 175. The reduced diameter portion receives a bushing 176 which bears against the shoulder and on the upper end of the axle bearing 157. The bushing 176 passes through the dust plate 108 and the hole 164 and the handle extension 162. The axle is threaded into the threaded hole 140 in the body member 100 so as to force the bushing 176 against the reducing shoulder 173. A locking nut 177 prevents unthreading of the axle. Sufficient space is provided between the head 171 and the bushing 176 to accommodate the handle extension 161 and the ground wheel 150, 151 so that these parts are freely rotatable on the axle. The axle is shown at about 20° to the ground line GL. The handle 160 makes an angle of about 15° with the axle, Figure 14. The bearing surfaces between the axle and the ground wheel are lubricated through a fitting 178 carried at the end of the axle and suitable passages to conduct the lubricant to the bearing surfaces.

In Figure 17, the full C—L indicates the center line of the handle when in the median position (dotted line position, Figure 11). It intersects the axial line A—A at B which locates the apex of the cone about which it swings. The dotted line C—L indicates the position the center line of the handle would assume if the handle were swung all the way down. The line V is a vertical erected through B. The path of any point such as D on C—L during the movement of the handle is indicated by the line D—D' at right angles to the axis A—A. It crosses V at E. The arc F is drawn at the radius G—D about the center H to represent the base of the cone D—D', and the line E—E' is drawn parallel to A—A. The intersections of E—E' and F at K and K' and radii H—K and H—K' locate the center line C—L of the handle in the oblique plane, and the angle these radii make with A—A indicates the angles above the horizontal at which C—L is in a plane at right angles to the median plane.

Where the mower is intended for use always as a right-handed or as a left-handed mower, the body 180 (Fig. 18) similar to body 100 above described is provided with an obliquely, upwardly extending, handle-carrying arm 181. The handle brackets 161 and 162 and catch 165 are not required.

The mower illustrated in Figures 11 to 18, except the shaft, the bearings, the shear plates, axle bushing and gears, is preferably made largely of aluminum in order to reduce weight and eliminate corrosion.

Where one wishes to obtain the advantages of cutting grass with back and forth movement of the mower, a fixed, horizontal cutter bar with forwardly and rearwardly facing edges may be used under a cylindrical cutter gear driven in both directions from a ground wheel having a horizontal axis. The operating handle may be fixed or shiftable as above discussed.

Since it is obvious that the invention may be embodied in other forms and constructions within the scope of the claims, I wish it to be understood that the particular forms shown are but two of these forms, and various modifications and changes being possible, I do not otherwise limit myself in any way with respect thereto.

What is claimed is:

1. A lawn mower comprising a body carrying above and laterally of one face thereof a relatively stationary ground shoe and shear and a cooperative rotary cutter and carrying below and lateral of the other face an axle, the body and parts carried thereby being symmetrical about a normally vertical median plane, a conical ground wheel carried on the axle and drivingly connected with the rotary cutter, the lower face of the ground wheel being at substantially a common level with the shoe so that the shoe moves over the ground close to it when the ground wheel is in rolling contact therewith, the mass distribution of the body carried parts and wheel being such that the center of gravity is beyond the smaller diameter end of the wheel so that the assembly tends to lift the shoe and overturn, and an elongated propulsion handle, extending radially from the axle in a direction such that the line of thrust is toward the tread of the wheel and secured to the axle to traverse the surface of a cone diverging away from the smaller end of the ground wheel, and means to secure the handle and body together and in a position to one side of the median plane such that when the end of the handle is supported extraneously the center of gravity of the entire mower is shifted past the smaller end of the ground wheel within the ground contacting portion of the tread so that the mower is stable.

2. In a lawn mower, a rotary cutter having a hub, a plurality of radially extending blades secured to the hub, the blades being formed of sheet metal members of L-shaped cross section arranged back to back and having oppositely facing shearing edges in the surface of a cone coaxial with the hub.

3. In a lawn mower, a rotary cutter having a hub, a plurality of radially extending blades secured to the hub, the blades being formed of sheet metal members of L-shaped cross section arranged back to back and having oppositely facing shearing edges in the surface of a cone coaxial with the hub, a cutter carrying shaft, a shoe adapted to move over the ground, a common support for the shoe and shaft, a shear plate having oppositely facing cutting edges converging outwardly toward one another and disposed about the shaft axis and on the surface of said cone, means to adjust the cutter along the axis of the shaft, and means to adjust the shear plate relative to the shoe.

4. In a lawn mower, a rotatable shaft, a rotatable cutter having shearing edges which face in one angular direction and when revolved traverses the surface of a right circular cone, a shoe movable over the ground, a common support for the shoe and shaft, and a shoe carried shear plate underneath the cutter axis and provided with a straight shearing edge facing the cutter shearing edges and cooperable therewith, the shear plate edge being oblique to the vertical plane through the cutter axis so that the line of contact of the edges shifts therealong as the cutter turns in a direction to bring the edges into shearing engagement.

5. In a lawn mower, such as claimed in claim 4, wherein the cutter and shear plate each have shearing edges facing in the opposite direction for similar cooperation when the cutter turns in the opposite direction.

6. A lawn mower having an obliquely disposed ground wheel rotatable about a sloping axis as the wheel rides along the ground, a wheel supported shear plate extending laterally away from the wheel near the ground line and carried thereby along the ground, and a cutter rotatable about an oblique axis between the shear plate and wheel and drivingly connected with the ground wheel, the rotatable cutter having shearing edges cooperative with the shear plate.

7. A lawn mower such as claimed in claim 6, wherein the shear plate has front and rear edges and the cutter has two shearing edges facing front and rear so that the mower cuts irrespective of direction of propulsion.

8. A lawn mower such as claimed in claim 6, wherein the cutter has shearing edges which traverse a conical surface as the cutter is revolved so that successive edges thereof are carried past the shear plate as the shear plate moves relative to the ground.

9. A lawn mower such as claimed in claim 6, wherein the shear plate has front and rear edges and the cutter has pairs of shearing edges each facing front and rear to traverse a conical region as the cutter is revolved so that successive edges thereof are carried past the shear plate irrespective of the direction of rotation.

10. A lawn mower such as claimed in claim 6, wherein the shearing edges of the rotatable cutter are close together and face oppositely from radial planes through the cutter axis and the shear plate has front and rear edges which converge outwardly.

11. A lawn mower such as claimed in claim 6, wherein the ground wheel has a conical face and the sloping axis on which it is mounted is such that the ground engaging face of the wheel is horizontal.

12. A lawn mower such as claimed in claim 6, wherein the shear plate is carried on a body which rotatably carries the ground wheel and the rotary cutter.

13. A lawn mower such as claimed in claim 12, having a propulsion handle with a bifurcated lower end and secured to the body and receiving the said wheel.

14. A lawn mower having a ground wheel rotatable about a sloping axis as the wheel rides along the ground, a laterally extending shear carrying shoe, a ground wheel driven rotary cutter cooperative with the shear carrying shoe, a wheel, cutter and shoe supporting body which supports the wheel and cutter with their axes in a normally vertical, laterally extending plane median of the shoe, and a propulsion handle secured to the body and extending obliquely upward from the wheel axis in a plane substantially at right angles to the laterally extending plane.

15. A lawn mower such as claimed in claim 14, having means to selectively secure the propulsion handle so that it extends to one side or to the other of the laterally extending plane so that, viewed from the free end of the handle, the shoe is to the right or to the left of the wheel.

16. In a lawn mower, a body generally symmetrical about a vertical plane transverse of the direction of mowing and provided with a shoe portion extending over the ground, an intermediate portion extending upwardly and away from the shoe and an upper portion provided with an obliquely downwardly extending axle in said plane, a ground wheel mounted on the axle and having a lower surface to support the shoe portion near the ground, the shoe portion carrying stationary shear edges facing away from the transverse vertical plane, and a ground wheel driven rotatable cutter carried by the intermediate portion of the body for rotation in an axis in said transverse plane and having forwardly and rearwardly facing edges cooperable with the stationary shear edges.

17. In a lawn mower, a body generally symmetrical about a vertical plane transverse of the direction of mowing and provided with a shoe portion extending over the ground, an intermediate portion extending upwardly and away from the shoe and an upper portion provided with an obliquely downwardly extending axle in said plane, a ground wheel mounted on the axle and having a lower surface to support the shoe portion near the ground, the shoe portion carrying stationary shear edges facing away from the transverse vertical plane, a ground wheel driven rotatable cutter carried by the intermediate portion of the body for rotation in an axis in said transverse plane and having forwardly and rearwardly facing edges cooperable with the stationary shear edges, a propulsion handle, and means to secure the handle to the body so that it extends upwardly and obliquely from the wheel axis in a direction in a plane substantially at right angles to the transverse plane.

18. In a lawn mower such as claimed in claim 17, wherein the securing means is duplicated on opposite sides of the transverse plane so that the handle may be secured at either side of said plane.

19. A lawn mower having a conical ground wheel which, when in rolling contact with the ground, has a rearwardly tilting axis, a body member having a tilted bearing about which the ground wheel revolves and a fixedly carried shear blade slightly above ground level and extending forwardly from the lower portion of the ground wheel, a body carried, ground wheel driven rotary shear cooperative with the fixed shear blade, a handle secured to the body for adjustment about the wheel axis, and means to lock the handle so that it extends diagonally upward to the right or to the left as viewed from the front end of the fixed shear blade.

20. A lawn mower having a horizontal shoe carrying a shear blade, an upwardly extending arm at one end of the shoe, a shaft carried on the arm and extending obliquely upward above the shoe, a rotary shearing cutter carried by the shaft and cooperative with the shoe carried shear, an obliquely downwardly extending bearing member at the upper end of the arm, a ground wheel rotatably mounted on the bearing member and drivingly connected with the shaft, a handle, and a handle securing means whereby the handle may extend upwardly to one side or to the other side of the vertical plane through the wheel axis so that when the handle is in one position the shoe extends to the right and in the other position the shoe extends to the left.

21. In a lawn mower, a handle having a bifurcated lower end, a body member secured to the bifurcations and having a wheel bearing between them, a ground wheel mounted on the bearings and adapted to support the lower end of the handle above the ground, the wheel having a conical periphery, the body member having a downwardly extending bracket provided with an extension slightly above the bottom of the ground wheel and adapted to move close to the ground, a rotary cutter carried by the bracket and gear driven by the ground wheel, the cutter having movable blades and the extension having a cooperative fixed blade to shear off grass.

22. In a lawn mower, a ground wheel of conical shape revolvable about the axis of the cone, a body having a bearing member about which the ground wheel is mounted for such rotation, a handle secured to the body so that the wheel may be revolved as it is moved along on the ground, the body having an arm extending laterally from the larger diameter side of the wheel at a level slightly above the bottom of the wheel, and carrying a shear plate, a cutter rotatably carried by the body and having shear plates cooperable with the stationary shear plate, and wheel driving gearing for rotating the cutter.

23. A grass mower comprising a relatively fixed body member having a normally horizontal portion adapted to move over the ground surface where the grass is to be cut and carrying a stationary shear plate, the body member having an upper portion provided with an outer bearing sloping downwardly and away from the horizontal portion, a ground wheel rotatably carried on the bearing and having its periphery slightly below the horizontal portion of the body member, a shaft rotatably carried by the body member between the wheel bearing and the horizontal portion, gearing interconnecting the ground wheel and shaft for driving the shaft, and a rotatable cutter carried by the shaft and movable past the shear plate.

24. In a lawn mower, a ground wheel having a cup-shaped body of generally conical configuration adapted to roll over the ground and carrying interiorly thereof near the open end an internal beveled gear with a conical pitch surface and carrying at the smaller end an inwardly extending, tubular, upwardly sloping axle bearing co-axial with the conical pitch surface of the gear.

25. A lawn mower comprising a ground wheel having a cup-shaped body of generally conical configuration adapted to roll over the ground and carrying interiorly thereof near the open end an internal beveled gear, and carrying at the smaller end an inwardly extending tubular upwardly sloping axle bearing, a relatively fixed axle extending through the bearing and on which the ground wheel rotates, a body fixedly secured to the axle and carrying a shaft disposed at a steeper angle than the axle, a pinion carried by the second shaft and in mesh with the bevel gear, the body having an obliquely downwardly extending shoe adapted to move over the ground as the ground wheel rolls, and carrying a shear plate with laterally facing shearing edges, and a cutter carried by the second shaft and having shearing edges movable past the edges of the shear plate.

26. A lawn mower such as claimed in claim 25, having a handle including two extensions, one apertured to receive the outer end of the axle, the other to receive the inner end of the axle, and means to couple the second handle extension to the body to secure definite angular relation of the handle and shoe.

27. In a lawn mower, a shearing mechanism comprising a body having a lower shoe portion sloping upwardly at a relatively low angle, a middle portion sloping upwardly at a steeper angle and an upper mounting portion at a still steeper angle, the middle portion being apertured and carrying a shaft barrel extending obliquely upwardly at right angles thereto, a shaft carried on bearings in the barrel and protruding in both directions beyond the barrel, a driving gear mounted on the lower end of the shaft, a rotary cutter mounted on the upper end of the shaft and having a plurality of radially extending oppositely facing blades in the surface of a cone of less apex angle than the angle included between the upper and lower portions of the body, and a shear plate carried by the lower portion of the body and cooperative with the cutter.

28. In a lawn mower such as claimed in claim 27, wherein the cutter has a hub portion extending about the upper end of the bushing to cover the upper bearing.

29. In a lawn mower, a ground wheel, an obliquely disposed axle on which the ground wheel is rotatably mounted, a bifurcated handle embracing the ground wheel and carried by the axle for angular movement about its axis, a body non-rotatably carried by the upper end of the axle and having its upper end lockable to the handle to position the handle in fixed position on the body, the body extending downwardly and outwardly past the ground wheel and forming a shoe above the tread level of the ground wheel, a stationary shear plate carried by the shoe, a rotary cutter carried by the body to revolve about a sloping axis steeper than the axis of the axle, and a gear drive between the ground wheel and the cutter.

30. In a lawn mower, a centrally apertured, cup-shaped stamping with generally conical side walls, a conical tread about the stamping to form a ground wheel, a tubular bushing secured to the bottom of the stamping and axially extending toward the open end, an internally beveled gear secured inside the open end of the stamping, a headed axle extending through the bushing from the lower end and having a protruding reduced and threaded end beyond the bushing, a spacer carried by the reduced end and bearing against the bushing, a body having a threaded hole into which the axle is tightly threaded to clamp the spacer in place, a handle having apertured mounting members, one extending outside the tread and apertured to receive the axle inside the head thereof and the other apertured to receive the spacer, the body and second mentioned handle mounting member having latching means to couple the handle and body in selected relative angular positions about the axle axis, a body carried stationary shear plate, and a body carried rotary cutter gear driven by the internal gear and cooperative with the shear plate.

31. In a lawn mower, a centrally apertured, cup-shaped stamping with generally conical side walls, a conical tread about the stamping to form a ground wheel, a tubular bushing secured to the bottom of the stamping and axially extending toward the open end, an internally bevelled gear secured inside the open end of the stamping, a headed axle extending through the bushing from the lower end and having a protruding reduced and threaded end beyond the bushing, a spacer carried by the reduced end and bearing against the bushing, a body having a threaded hole into which the axle is tightly threaded to clamp the spacer in place, a handle having apertured mounting members, one extending outside the tread and apertured to receive the axle inside the head thereof and the other apertured to receive the spacer, the body and second mentioned handle mounting member having latching means to couple the handle and body in selected relative angular positions about the axle axis, the body having on the opposite side of the axle axis from the latching means, an apertured extension disposed at an obtuse angle thereto, a shaft barrel extending through the apertured extension and having a threaded lower end and upwardly and downwardly opening bearing seats, a ring threaded on the reduced lower end of the shaft barrel for clamping the barrel in place, bearings in the bearing seats, a shaft extending through the bearings, thrust adjusting means for holding the shaft against axial movement, a bevel pinion carried by the lower end of the shaft and in engagement with the bevel gear, the body having a shoe portion at an obtuse angle to the apertured portion, the shoe portion carrying a shear plate with laterally facing shearing edges in the surface of a cone about the shaft axis, and a rotary cutter carried by the other end of the shaft and having shearing edges cooperative with the shearing edges of the shear plate and traversing a conical path.

32. In a lawn mower, a rotary cutter having a plurality of blades with oppositely facing shearing edges in a coaxial surface of revolution and a relatively stationary shear plate having oppositely facing cutting edges, disposed on the same surface of revolution so as to cooperate with the said cutter, the cutter being inside the shear plate so that when a shearing edge on the shear plate faces grass an opposed edge of the cutter applies force against the opposite side of the grass to shear it.

33. A lawn mower having a ground wheel, a laterally extending shear carrying shoe, a ground wheel driven rotary cutter cooperative with the shear carrying shoe, a wheel, cutter and shoe supporting body which supports the wheel and cutter with their axes in a normally vertical, laterally extending plane median of the shoe, and a propulsion handle secured to the body and extending obliquely upward from the wheel axis in a plane substantially at right angles to the laterally extending plane.

34. A lawn mower comprising a body carrying above and laterally of one face thereof a relatively stationary ground shoe and shear and a cooperative rotary cutter and carrying below and lateral of the other face an axle, the body and parts carried thereby being symmetrical about a normally vertical median plane, a ground wheel carried on the axle and drivingly connected with the rotary cutter, the lower face of the ground wheel being at substantially a common level with the shoe so that the shoe moves over the ground close to it when the ground wheel is in rolling contact therewith, the mass distribution of the body carried parts and wheel being such that the center of gravity is beyond the smaller diameter end of the wheel so that the assembly tends to lift the shoe and overturn, and an elongated propulsion handle secured to the body in a position to one side of the median plane such that when the end of the handle is supported extraneously the center of gravity of the entire mower is shifted past the smaller end of the ground wheel within the ground contacting portion of the tread so that the mower is stable.

35. In a lawn mower, a relatively stationary shear plate adapted to be bodily moved towards standing grass and having a body of upwardly concave cross section and provided with oppositely facing cutting edges converging outwardly toward one another and disposed on the surface of a cone whose axis is interior of the plate body so as to cooperate with a coaxial cutter.

36. A lawn mower as claimed in claim 35 having a rigid shoe under the shear plate and to which it is attached.

37. A lawn mower comprising a relatively stationary shear plate adapted to be bodily moved toward standing grass and having a body of upwardly concave cross-section and provided with oppositely facing cutting edges converging outwardly toward one another and disposed on the surface of a cone whose axis is interior of the plate body and a cutter comprising a body mounted for rotation about said axis, said cutter having a hub, a plurality of radially extending blades secured to the hub, the blades being formed of sheet metal members of L-shaped cross section arranged back to back and having oppositely facing shearing edges in the surface of the cone and adapted when rotated to bring one of its shearing edges toward the opposed shearing edge of the plate to shear grass in front of the shear plate edge.

References Cited in the file of this patent

UNITED STATES PATENTS

| | | |
|---|---|---|
| 1,794,178 | Karcher | Feb. 24, 1931 |
| 1,854,859 | O'Maley | Apr. 19, 1932 |
| 1,970,838 | Buettner | Aug. 21, 1934 |
| 2,076,344 | Leake | Apr. 6, 1937 |
| 2,192,762 | Viveze | Mar. 5, 1940 |
| 2,507,007 | Hardersen | May 9, 1950 |
| 2,517,405 | Moss | Aug. 1, 1950 |
| 2,518,136 | Goldberg | Aug. 8, 1950 |
| 2,529,797 | Cauble | Nov. 14, 1950 |
| 2,557,897 | Sullivan | June 19, 1951 |